(12) United States Patent
Liao

(10) Patent No.: US 9,753,253 B2
(45) Date of Patent: Sep. 5, 2017

(54) OPTICAL LENS SYSTEM

(71) Applicant: Chen-Cheng Liao, Hsinchu Science Park (TW)

(72) Inventor: Chen-Cheng Liao, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 4 days.

(21) Appl. No.: 14/560,440

(22) Filed: Dec. 4, 2014

(65) Prior Publication Data

US 2016/0161706 A1 Jun. 9, 2016

(51) Int. Cl.
*G02B 9/58* (2006.01)
*G02B 9/60* (2006.01)
*G02B 13/18* (2006.01)
*G02B 13/00* (2006.01)
*G02B 13/06* (2006.01)

(52) U.S. Cl.
CPC ............. *G02B 13/004* (2013.01); *G02B 9/58* (2013.01); *G02B 9/60* (2013.01); *G02B 13/0045* (2013.01); *G02B 13/06* (2013.01)

(58) Field of Classification Search
CPC .......... G02B 9/58; G02B 9/60; G02B 13/004; G02B 13/0045
USPC ........................................ 359/715, 770, 782
See application file for complete search history.

(56) References Cited

U.S. PATENT DOCUMENTS

| 7,760,444 | B2* | 7/2010 | Iyama | ................. G02B 15/177 348/335 |
|---|---|---|---|---|
| 7,852,572 | B2 | 12/2010 | Robinson | |
| 7,864,452 | B2 | 1/2011 | Ning | |
| 8,654,457 | B2 | 2/2014 | Jin et al. | |
| 2006/0227434 | A1 | 10/2006 | Hirose et al. | |
| 2008/0037138 | A1 | 2/2008 | Lang et al. | |
| 2008/0239517 | A1 | 10/2008 | Mori | |
| 2008/0316618 | A1 | 12/2008 | Yamakawa et al. | |
| 2011/0051262 | A1 | 3/2011 | Imaoka | |
| 2011/0102541 | A1* | 5/2011 | Jin | ........................... G02B 9/60 348/36 |
| 2012/0194922 | A1* | 8/2012 | Tang | ........................ G02B 9/34 359/716 |
| 2012/0229918 | A1* | 9/2012 | Chen | ..................... G02B 13/006 359/715 |
| 2013/0010375 | A1* | 1/2013 | Chen | .................. G02B 13/0045 359/715 |
| 2013/0188265 | A1 | 7/2013 | Ebbesmeier et al. | |
| 2014/0098432 | A1* | 4/2014 | Kubota | ............... G02B 13/004 359/781 |
| 2014/0226222 | A1 | 8/2014 | Hsieh et al. | |
| 2015/0062720 | A1* | 3/2015 | Lai | ......................... G02B 13/04 359/713 |

(Continued)

*Primary Examiner* — Darryl J Collins
(74) *Attorney, Agent, or Firm* — Muncy, Geissler, Olds & Lowe, P.C.

(57) ABSTRACT

An optical lens system includes a first lens element of negative refractive power having a meniscus shape, a second lens element of positive refractive power having a convex image-side surface and disposed adjacent to the first lens element, a third lens element of positive refractive power having at least one aspheric surface and disposed adjacent to the second lens element, and a fourth lens element of negative refractive power having at least one aspheric surface and disposed adjacent to the third lens element.

17 Claims, 18 Drawing Sheets

(56) References Cited

U.S. PATENT DOCUMENTS

| | | | |
|---|---|---|---|
| 2015/0109686 A1* | 4/2015 | Lee .................... | G02B 13/004 |
| | | | 359/715 |
| 2015/0185435 A1* | 7/2015 | Wang ................. | H04N 5/2252 |
| | | | 348/373 |
| 2016/0033745 A1* | 2/2016 | Chen ................. | G02B 13/0045 |
| | | | 359/713 |

* cited by examiner

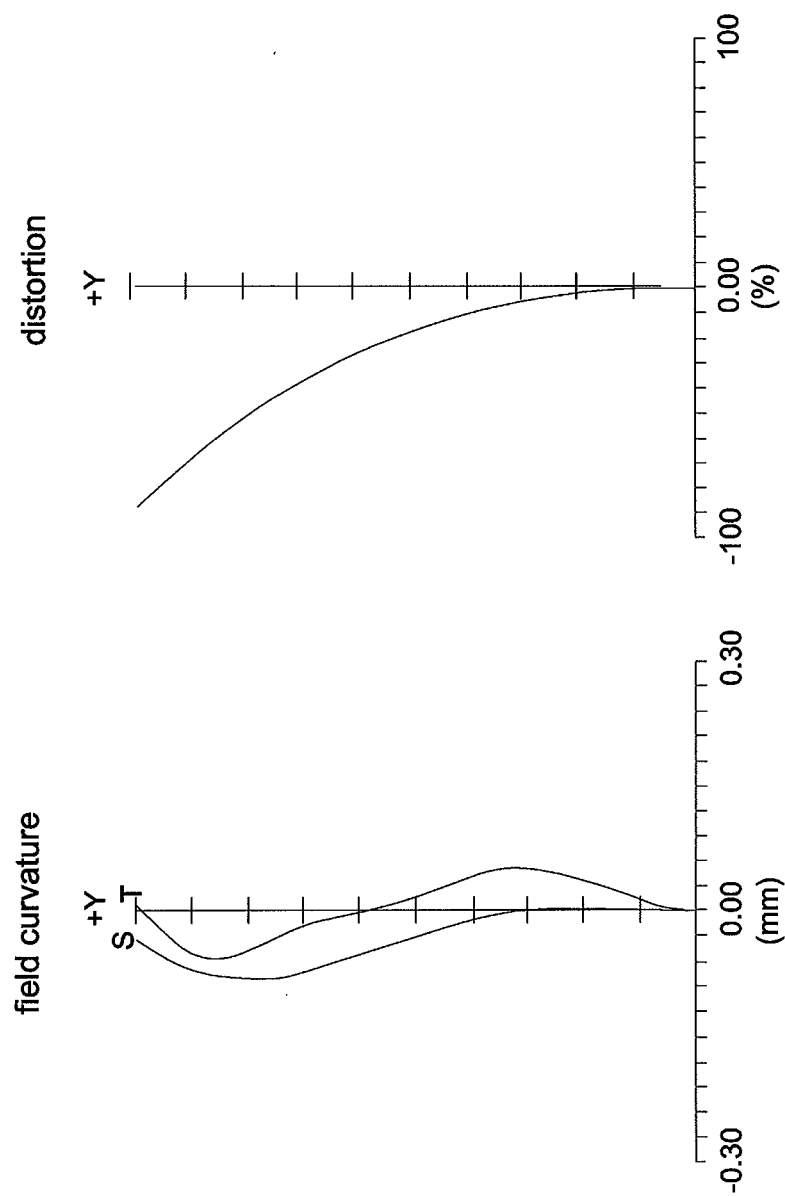

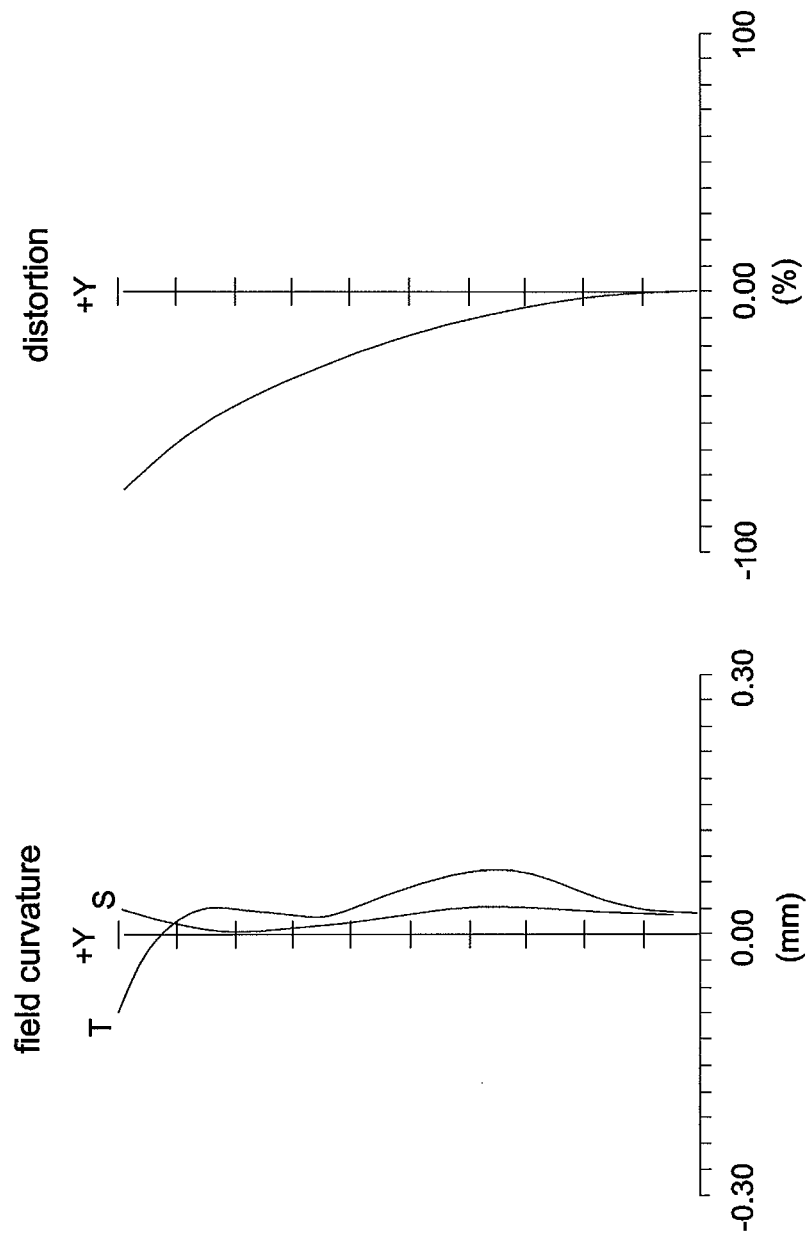

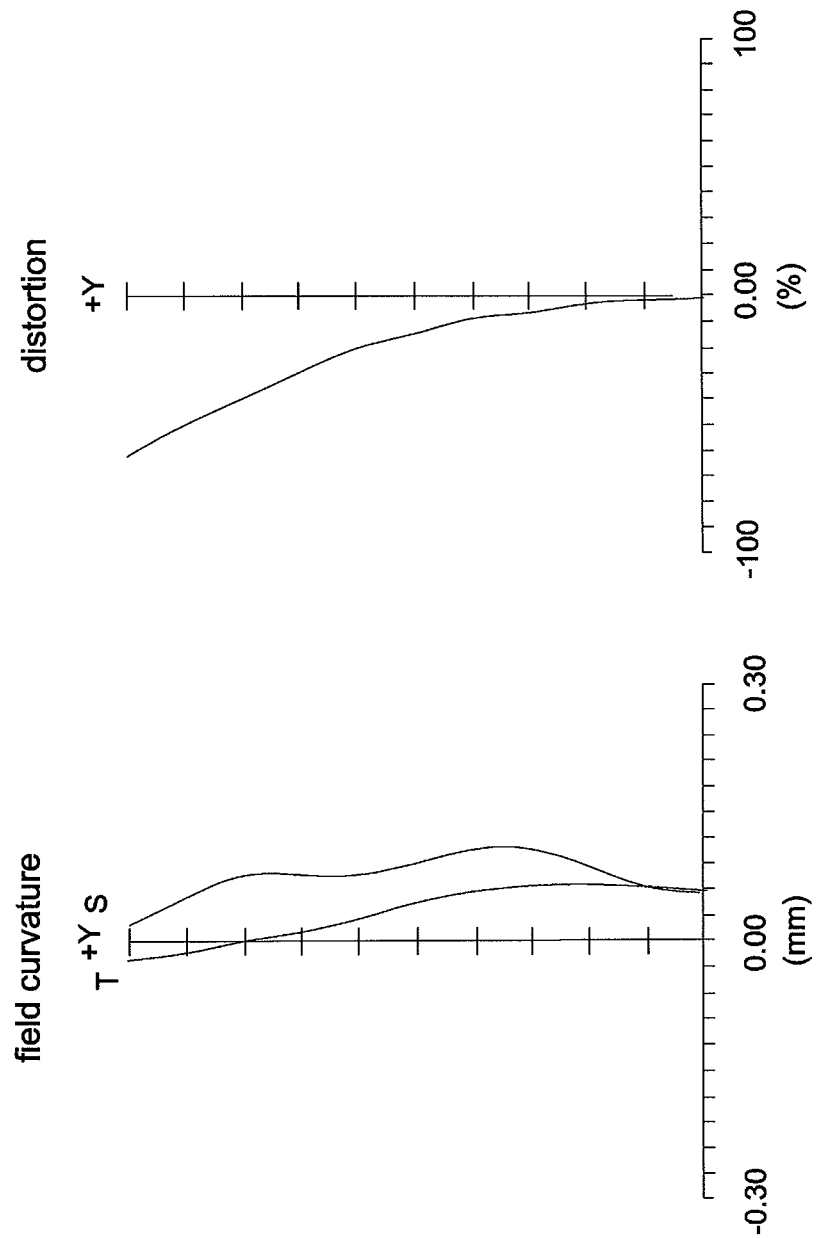

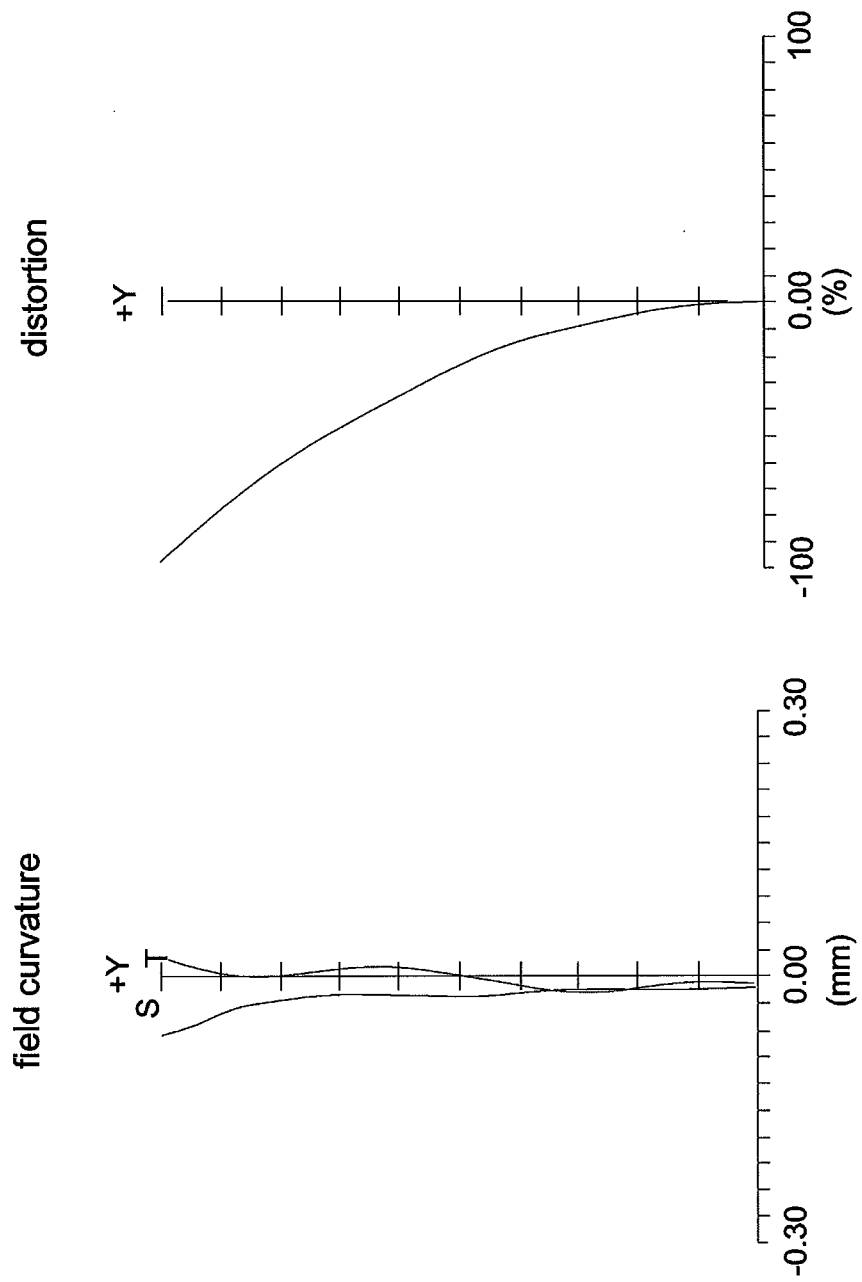

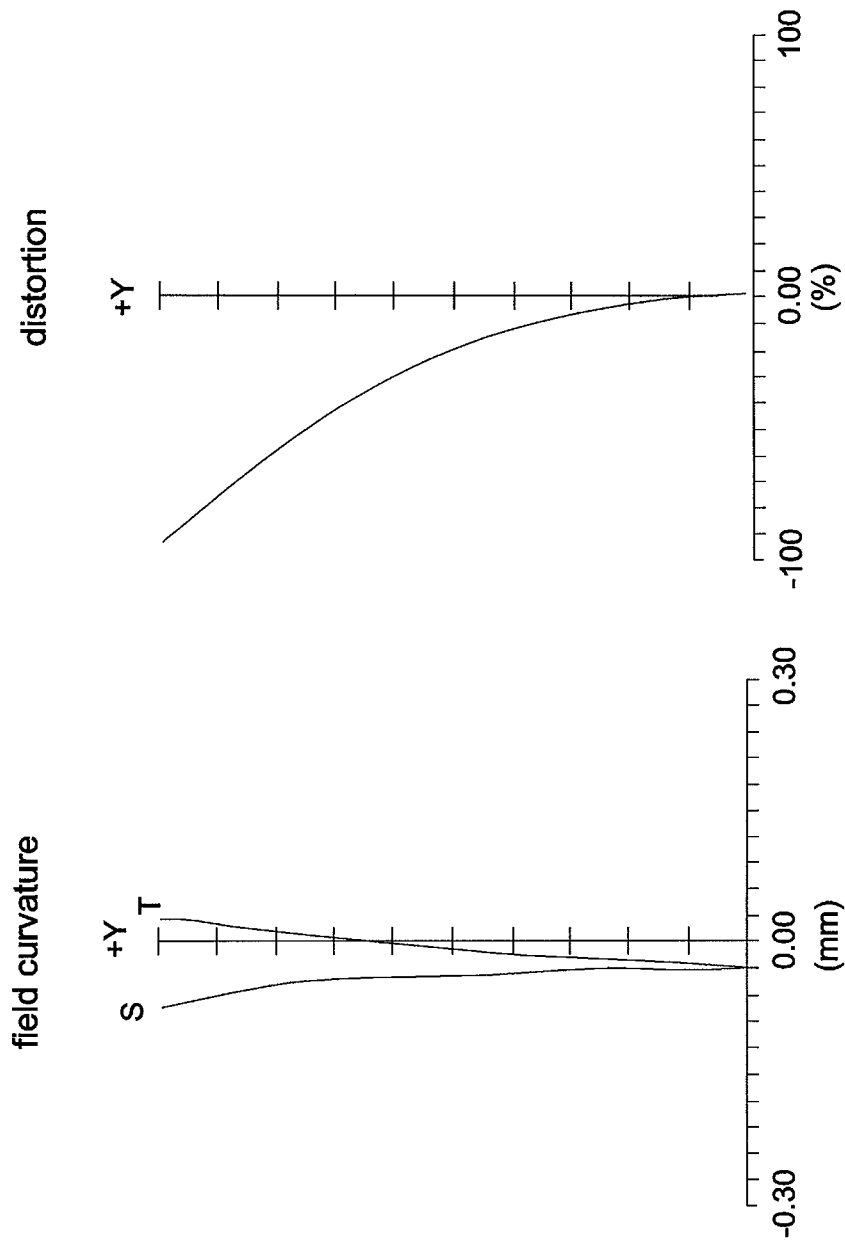

OPTICAL LENS SYSTEM

BACKGROUND OF THE INVENTION

Field of the Invention

The invention relates generally to an optical lens system and, more particularly, to a wide-angle optical lens system usable with, for example, light sensitive receivers and/or sensors.

Description of the Related Art

In recent years, with the popularity of electronic products having camera functionalities, the current trend is toward miniaturization of an optical lens system in an imaging device, such as a vehicle camera or surveillance camera. Further, because the manufacturing technologies for CCD (Charge-Coupled Device) or CMOS (Complementary Metal-Oxide Semiconductor) sensors have advanced to reduce the size of a light sensitive sensor, an optical lens system in a camera module should be correspondingly reduced in length, in which case the requirement of wide-angle image capture should be also met. Therefore, it is desirable to provide a high-performance optical lens system that satisfies the above requirements and is favorable for correcting aberrations to match with a high-resolution light sensitive sensor.

BRIEF SUMMARY OF THE INVENTION

According to one aspect of the present disclosure, an optical lens system includes a first lens element of negative refractive power having a meniscus shape, a second lens element of positive refractive power having a convex image-side surface and disposed adjacent to the first lens element, a third lens element of positive refractive power having at least one aspheric surface and disposed adjacent to the second lens element, and a fourth lens element of negative refractive power having at least one aspheric surface and disposed adjacent to the third lens element.

According to another aspect of the present disclosure, an optical lens system includes, in order from an object side to an image side, a first lens element, a second lens element, a third lens element and a fourth lens element. The first lens element with negative refractive power has a convex object-side surface and a concave image-side surface. The second lens element has refractive power and a convex image-side surface, the third lens element has refractive power and a convex image-side surface, and the fourth lens element has refractive power. At least one of the third lens element and the fourth lens element may be an aspheric lens element. At least one of an object-side surface and an image-side surface of the third lens element may be an aspheric surface. At least one of an object-side surface and an image-side surface of the fourth lens element may be an aspheric surface.

In one embodiment, the optical lens system satisfies the following condition: $0.2<|f1/f2|<0.7$, where f1 denotes a focal length of the first lens element and f2 denotes a focal length of the second lens element. In one embodiment, the optical lens system satisfies the following condition: $0.7<|f2/f3|<1.9$, where f2 denotes a focal length of the second lens element and f3 denotes a focal length of the third lens element.

In one embodiment, the optical lens system satisfies the following condition: $0.8<|f3/EFL|<2.0$, where f3 denotes a focal length of the third lens element L3 and EFL denotes an effective focal length of the optical lens system.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIGS. 2-4 show aberration curves of the optical lens system illustrated in FIG. 1. FIG. 2 illustrates an astigmatic field curve, FIG. 3 illustrates a percentage distortion curve, and FIG. 4 shows a transverse ray fan plot.

FIGS. 6-8 show aberration curves of the optical lens system illustrated in FIG. 5. FIG. 6 illustrates an astigmatic field curve, FIG. 7 illustrates a percentage distortion curve, and FIG. 8 shows a transverse ray fan plot.

FIGS. 10-12 show aberration curves of the optical lens system illustrated in FIG. 9. FIG. 10 illustrates an astigmatic field curve, FIG. 11 illustrates a percentage distortion curve, and FIG. 12 shows a transverse ray fan plot.

FIG. 14 illustrates an astigmatic field curve, FIG. 15 illustrates a percentage distortion curve, and FIG. 16 shows a transverse ray fan plot.

FIGS. 18-20 show aberration curves of the optical lens system illustrated in FIG. 17. FIG. 18 illustrates an astigmatic field curve, FIG. 19 illustrates a percentage distortion curve, and FIG. 20 shows a transverse ray fan plot.

FIGS. 22-24 show aberration curves of the optical lens system illustrated in FIG. 21. FIG. 22 illustrates an astigmatic field curve, FIG. 23 illustrates a percentage distortion curve, and FIG. 24 shows a transverse ray fan plot.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
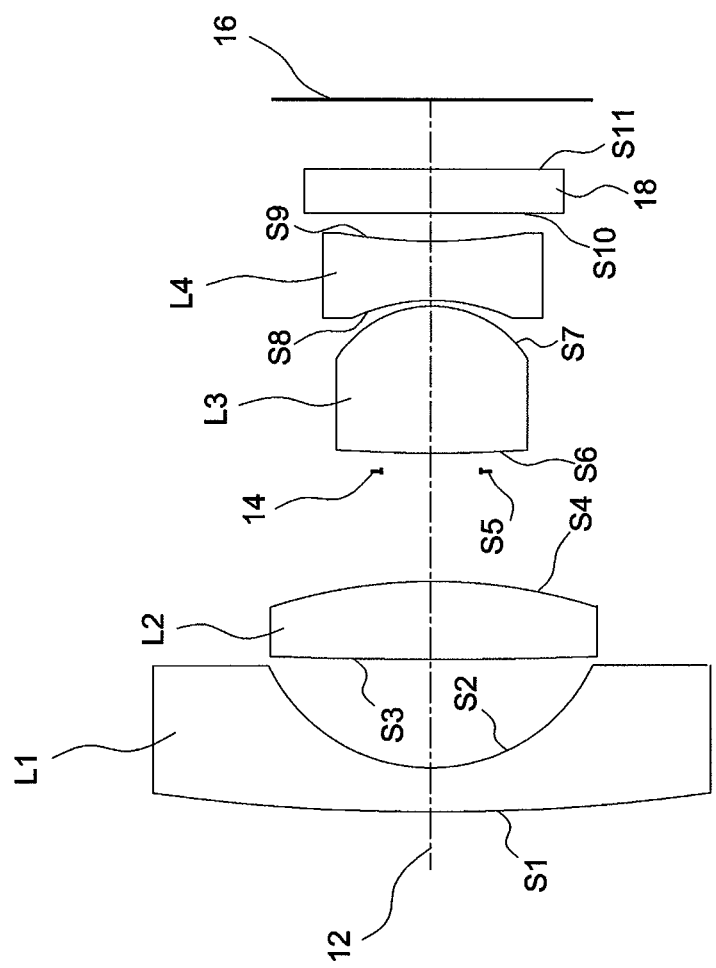
FIG. 1 shows a schematic diagram illustrating an optical lens system according to an embodiment of the invention.

An optical lens system according to an embodiment of the invention may include four lens elements L1, L2, L3 and L4 arranged in order, along an optical axis 12, from an object side (on the left of FIG. 1) to an image side (on the right of FIG. 1). An aperture stop 14 is located between the lens element L2 and the lens element L3. A light sensitive receiver 16, for example, an image sensor, is located on an image side of the lens element L4. An additional element 18, for example, a cover plate and/or filter, is located between the light sensitive receiver 16 and the lens element L4 and does not affect a focal length of the optical lens system. Typical filters include infrared light rejection filters and/or light blurring filters (e.g. low-pass filters, band pass filters, etc.). Each of the lens elements L1-L4 may be a single and non-cemented lens element with refractive power. The lens element L1 may have a negative power and a meniscus shape to contribute to enlarge the field of view of the optical lens system. The lens element L2 may have a positive power and a convex image-side surface to contribute to correct the off-axis aberration. The lens element L3 may have a positive power and at least one aspheric surface, and the lens element L4 may have a negative power and at least one aspheric surface to contribute to balance the spherical aberration and chromatic aberration.

The optical lens system according to one embodiment may satisfy the following condition:

$$0.2 < |f1/f2| < 0.7,$$

where f1 denotes a focal length of the lens element L1 and f2 denotes a focal length of the lens element L2 of the optical lens system. When the absolute value of f1/f2 is larger than 0.7, it may be difficult to effectively enlarge the field of view. In comparison, when the absolute value of f1/f2 is smaller than 0.2, the correction to off-axis aberration may become weaker to lower the resolution of the optical lens system.

Further, the optical lens system according to one embodiment may satisfy the following condition:

$$0.8 < |f3/EFL| < 2.0,$$

where f3 denotes a focal length of the lens element L3 and EFL denotes an effective focal length of the optical lens system. Therefore, it is favorable for correcting various kinds of aberration and reducing the optical path length of the optical lens system.

In one embodiment, each of the lens elements L1-L4 can be made of glass or plastic. When the lens element is made of glass, the distribution of the refractive power of the optical lens system may be more flexible to design, and the glass material is not sensitive to temperature variations to ensure competent resolution of the optical lens system under different ambient temperatures. When the lens element is made of plastic, the manufacturing cost can be effectively reduced. Further, because the lens element may have at least one aspheric surface, more controllable variables are obtained, and the aberration is reduced, as well as the number of required lens elements can be reduced on constructing an optical lens system to reduce the total track length.

According to the optical lens system of the present disclosure, each of an object-side surface and an image-side surface of a lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it may indicate that the surface is convex at the paraxial region; and when the lens element has a concave surface, it may indicate that the surface is concave at the paraxial region.

According to the above embodiments, the optical lens system is featured with good correction ability and high image quality, in products such as vehicle cameras, surveillance cameras and mobile devices.

A first design example of the optical lens system is described in detail below with reference to FIG. 1. The lens element L1 with negative refractive power has a convex object-side surface S1 and a concave image-side surface S2. The lens element L2 with positive refractive power has a convex object-side surface S3 and a convex image-side surface S4. The lens element L3 with positive refractive power has a convex object-side surface S6 and a convex image-side surface S7, and the lens element L3 may have at least one aspheric surface. The lens element L4 with negative refractive power has a concave object-side surface S8 and a concave image-side surface S9, and the lens element L4 may have at least one aspheric surface.

The detailed optical data of the first example are shown in Table 1 and the aspheric surface data are shown in Table 2 below.

TABLE 1

F = 1.77 mm, Fno = 2.42, FOV = 160 deg.

| Surface | radius of curvature (mm) | thickness (mm) | refractive index | Abbe number |
|---|---|---|---|---|
| S1 | 31.738 | 0.650 | 1.729 | 54.680 |
| S2 | 2.742 | 1.609 | | |
| S3 | 135.419 | 1.100 | 1.847 | 23.778 |
| S4 | −8.746 | 1.712 | | |

TABLE 1-continued

F = 1.77 mm, Fno = 2.42, FOV = 160 deg.

| Surface | radius of curvature (mm) | thickness (mm) | refractive index | Abbe number |
|---|---|---|---|---|
| S5 (aperture stop) | Infinity | 0.279 | | |
| S6 | 6.031 | 2.200 | 1.768 | 49.790 |
| S7 | −1.690 | 0.060 | | |
| S8 | −50.149 | 0.960 | 1.847 | 23.778 |
| S9 | 3.767 | 0.369 | | |
| S10 (filter/cover plate) | Infinity | 0.615 | 1.525 | 54.080 |
| S11 (filter/cover plate) | Infinity | 1.118 | | |

In Table 1, surfaces S1 and S2 are two opposite surfaces of the lens element L1, surfaces S3 and S4 are two opposite surfaces of the lens element L2, surfaces S6 and S7 are two opposite surfaces of the lens element L3, surfaces S8 and S9 are two opposite surfaces of the lens element L4, and surfaces S10 and S11 are two opposite surfaces of the filter/cover plate 18.

Further, the aspheric surface satisfies the following equation:

$$x = \frac{c'y^2}{1 + \sqrt{1 - (1+k)c'^2 y^2}} + Ay^4 + By^6 + Cy^8 + Dy^{10} + Ey^{12} + Fy^{14}\ldots,$$

where x denotes a displacement from the vertex of a lens in the direction of the optical axis 12, c' denotes a reciprocal of the radius of curvature at the vertex of a lens (approaching the optical axis 12), K denotes a Conic constant, y denotes a height (distance in the direction perpendicular to the optical axis 12) of the aspheric surface, and A, B, C, D, E, and F are aspheric coefficients. The values of aspheric coefficients and Conic constant of each lens surface are listed in Table 2.

TABLE 2

| Radius | 31.738 | 2.742 | 135.419 | −8.746 | 6.031 | −1.690 | −50.149 | 3.767 |
|---|---|---|---|---|---|---|---|---|
| K | 0 | 0 | 0 | 0 | 0.00000E+00 | 0.00000E+00 | 0.00000E+00 | 0.00000E+00 |
| A | 0 | 0 | 0 | 0 | −2.12580E−02 | −2.77430E−02 | −1.00360E−01 | −4.67800E−02 |
| B | 0 | 0 | 0 | 0 | −5.40270E−02 | 3.23340E−02 | 3.83880E−02 | 6.02730E−03 |
| C | 0 | 0 | 0 | 0 | 1.02560E−01 | −1.62030E−02 | −2.91680E−02 | −1.78660E−03 |
| D | 0 | 0 | 0 | 0 | −1.56520E−01 | 3.33320E−03 | 5.28650E−03 | 2.11630E−04 |
| E | 0 | 0 | 0 | 0 | 0.00000E+00 | 0.00000E+00 | 0.00000E+00 | 0.00000E+00 |
| F | 0 | 0 | 0 | 0 | 0.00000E+00 | 0.00000E+00 | 0.00000E+00 | 0.00000E+00 |

Figure 4:
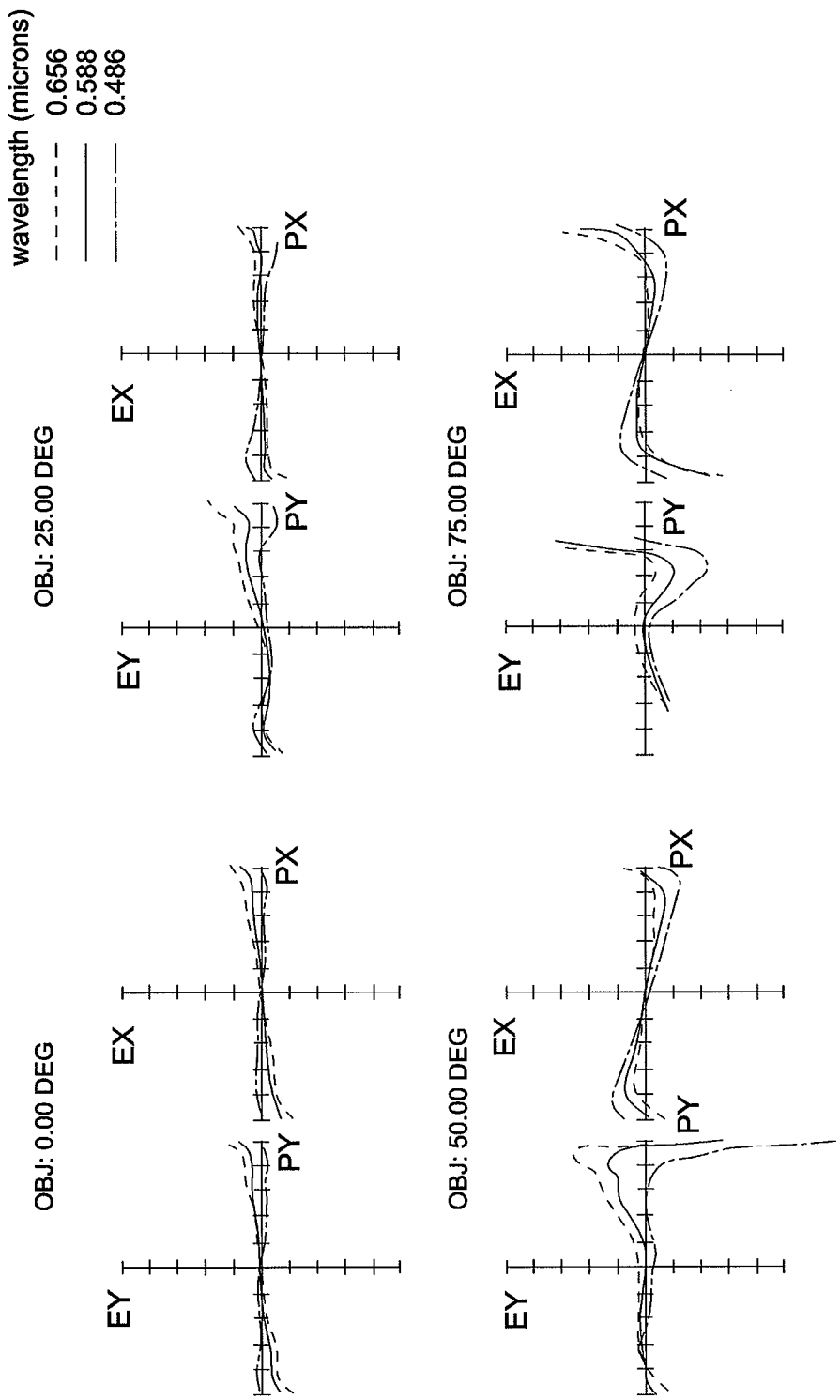

FIGS. 2-4 show aberration curves of the optical lens system illustrated in FIG. 1. FIG. 2 illustrates an astigmatic field curve, where the abscissa indicates the distance measured from the focal plane and the ordinate indicates different fields (from 0 to the maximum). FIG. 3 illustrates a percentage distortion curve where the abscissa indicates values of percentage distortion, and the ordinate indicates different fields (from 0 to the maximum), and FIG. 4 shows a transverse ray fan plot.

A second design example of the optical lens system is described in detail below with reference to FIG. 5. The lens element L1 with negative refractive power has a convex object-side surface S1 and a concave image-side surface S2. The lens element L2 with positive refractive power has a convex object-side surface S3 and a convex image-side surface S4. The lens element L3 with positive refractive power has a concave object-side surface S6 and a convex image-side surface S7. The lens element L4 with negative refractive power has a convex object-side surface S8 and a concave image-side surface S9. The detailed optical data of the second example are shown in Table 3 and the aspheric surface data are shown in Table 4 below.

TABLE 3

F = 1.6 mm, Fno = 2.0, FOV = 160 deg.

| Surface | radius of curvature (mm) | thickness (mm) | refractive index | Abbe number |
|---|---|---|---|---|
| S1 | 38.067 | 0.700 | 1.729 | 54.683 |
| S2 | 2.854 | 2.138 | | |
| S3 | 3421.721 | 1.100 | 1.923 | 20.880 |
| S4 | −7.767 | 1.273 | | |
| S5 (aperture stop) | Infinity | 0.342 | | |
| S6 | −20.179 | 2.118 | 1.768 | 49.790 |
| S7 | −1.652 | 0.060 | | |
| S8 | 5.161 | 0.960 | 1.836 | 23.520 |
| S9 | 2.552 | 0.369 | | |
| S10 (filter/cover plate) | Infinity | 0.615 | 1.525 | 54.087 |
| S11 (filter/cover plate) | Infinity | 1.187 | | |

TABLE 4

| Radius | 38.067 | 2.854 | 3421.721 | −7.767 | −20.179 | −1.652 | 5.161 | 2.552 |
|---|---|---|---|---|---|---|---|---|
| K | 0 | 0 | 0 | 0 | 0.00000E+00 | 0.00000E+00 | 0.00000E+00 | 0.00000E+00 |
| A | 0 | 0 | 0 | 0 | −3.87910E−02 | −1.61390E−02 | −7.12740E−02 | −5.96260E−02 |
| B | 0 | 0 | 0 | 0 | −6.74040E−02 | 3.01340E−02 | 3.65080E−02 | 1.53200E−02 |
| C | 0 | 0 | 0 | 0 | 6.84430E−02 | −1.41450E−02 | −1.90470E−02 | −5.57140E−03 |
| D | 0 | 0 | 0 | 0 | −7.60320E−02 | 3.03170E−03 | 4.00500E−03 | 1.12540E−03 |
| E | 0 | 0 | 0 | 0 | −7.98320E−02 | 6.15510E−06 | −2.67110E−04 | −1.01440E−04 |
| F | 0 | 0 | 0 | 0 | 0.00000E+00 | 0.00000E+00 | 0.00000E+00 | 0.00000E+00 |

Figure 5:
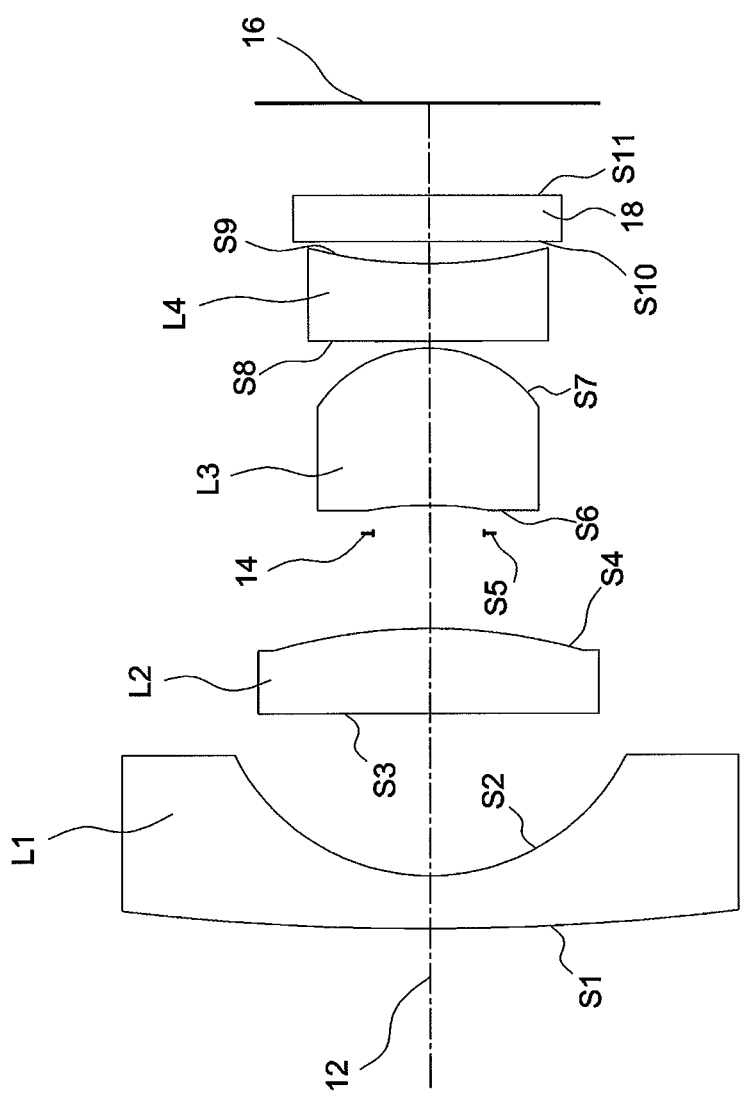
FIG. 5 shows a schematic diagram illustrating an optical lens system according to another embodiment of the invention.
Figure 8:
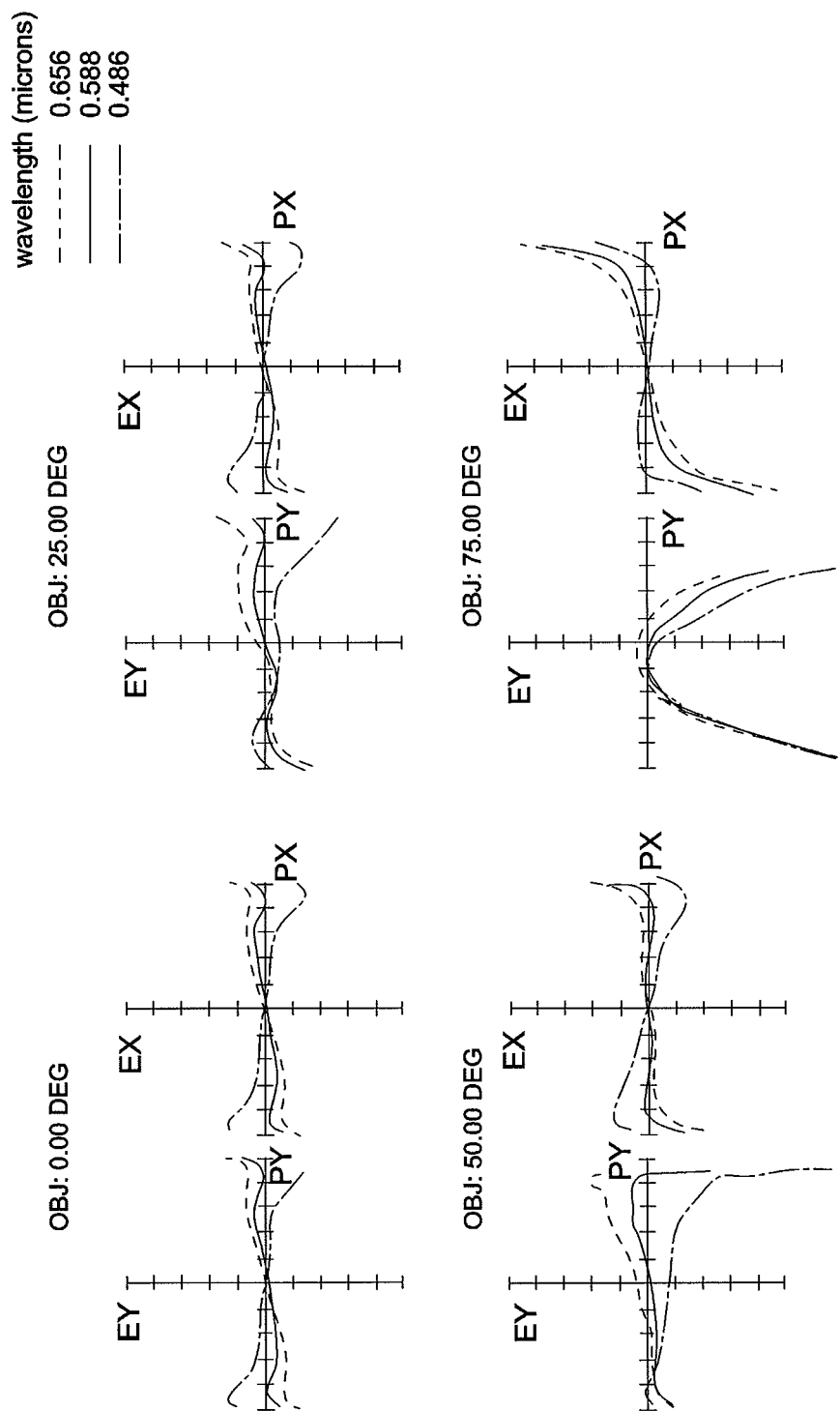

FIGS. 6-8 show aberration curves of the optical lens system illustrated in FIG. 5. FIG. 6 illustrates an astigmatic field curve, FIG. 7 illustrates a percentage distortion curve, and FIG. 8 shows a transverse ray fan plot.

A third design example of the optical lens system is described in detail below with reference to FIG. 9. The lens element L1 with negative refractive power has a convex object-side surface S1 and a concave image-side surface S2. The lens element L2 with positive refractive power has a concave object-side surface S3 and a convex image-side surface S4. The lens element L3 with positive refractive power has a convex object-side surface S6 and a convex image-side surface S7. The lens element L4 with negative refractive power has a convex object-side surface S8 and a concave image-side surface S9. The detailed optical data of the second example are shown in Table 5 and the aspheric surface data are shown in Table 6 below.

TABLE 5

F = 1.52 mm, Fno = 2.2, FOV = 150 deg.

| Surface | radius of curvature (mm) | thickness (mm) | refractive index | Abbe number |
|---|---|---|---|---|
| S1 | 44.127 | 0.650 | 1.729 | 54.683 |
| S2 | 2.821 | 2.192 | | |
| S3 | −11.997 | 1.100 | 1.923 | 18.897 |
| S4 | −5.776 | 1.631 | | |
| S5 (aperture stop) | Infinity | 0.421 | | |
| S6 | 5.392 | 2.100 | 1.545 | 55.915 |
| S7 | −1.598 | 0.060 | | |
| S8 | 4.607 | 0.797 | 1.638 | 23.256 |
| S9 | 2.777 | 0.369 | | |
| S10 (filter/cover plate) | Infinity | 0.615 | 1.525 | 54.087 |
| S11 (filter/cover plate) | Infinity | 1.075 | | |

TABLE 6

| Radius | 44.127 | 2.821 | −11.997 | −5.776 | 5.392 | −1.598 | 4.607 | 2.777 |
|---|---|---|---|---|---|---|---|---|
| K | 0 | 0 | 0 | 0 | 0.00000E+00 | 0.00000E+00 | 0.00000E+00 | 0.00000E+00 |
| A | 0 | 0 | 0 | 0 | −1.79180E−02 | −1.57020E−02 | −9.05140E−02 | −5.92960E−02 |
| B | 0 | 0 | 0 | 0 | −7.06820E−02 | 2.61920E−02 | 4.54370E−02 | 1.93530E−02 |
| C | 0 | 0 | 0 | 0 | 9.95720E−02 | −1.41150E−02 | −3.41710E−02 | −1.04310E−02 |
| D | 0 | 0 | 0 | 0 | −9.30060E−02 | 3.46570E−03 | 8.03250E−03 | 2.49420E−03 |
| E | 0 | 0 | 0 | 0 | 0.00000E+00 | 0.00000E+00 | 0.00000E+00 | 0.00000E+00 |
| F | 0 | 0 | 0 | 0 | 0.00000E+00 | 0.00000E+00 | 0.00000E+00 | 0.00000E+00 |

Figure 9:
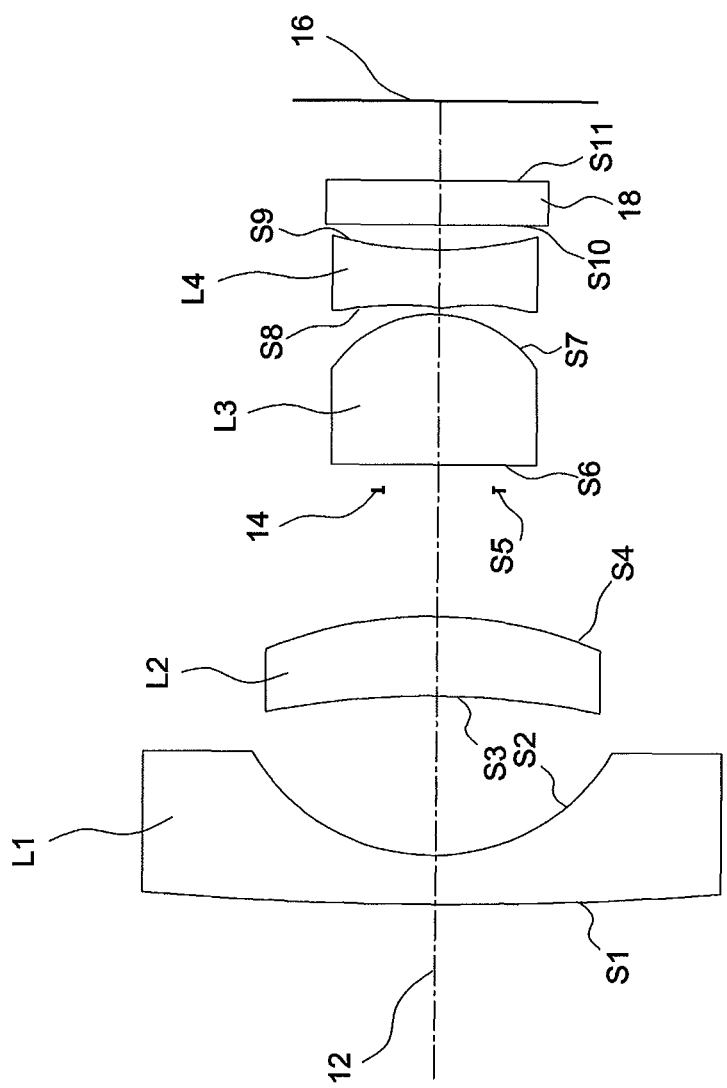
FIG. 9 shows a schematic diagram illustrating an optical lens system according to another embodiment of the invention.
Figure 12:
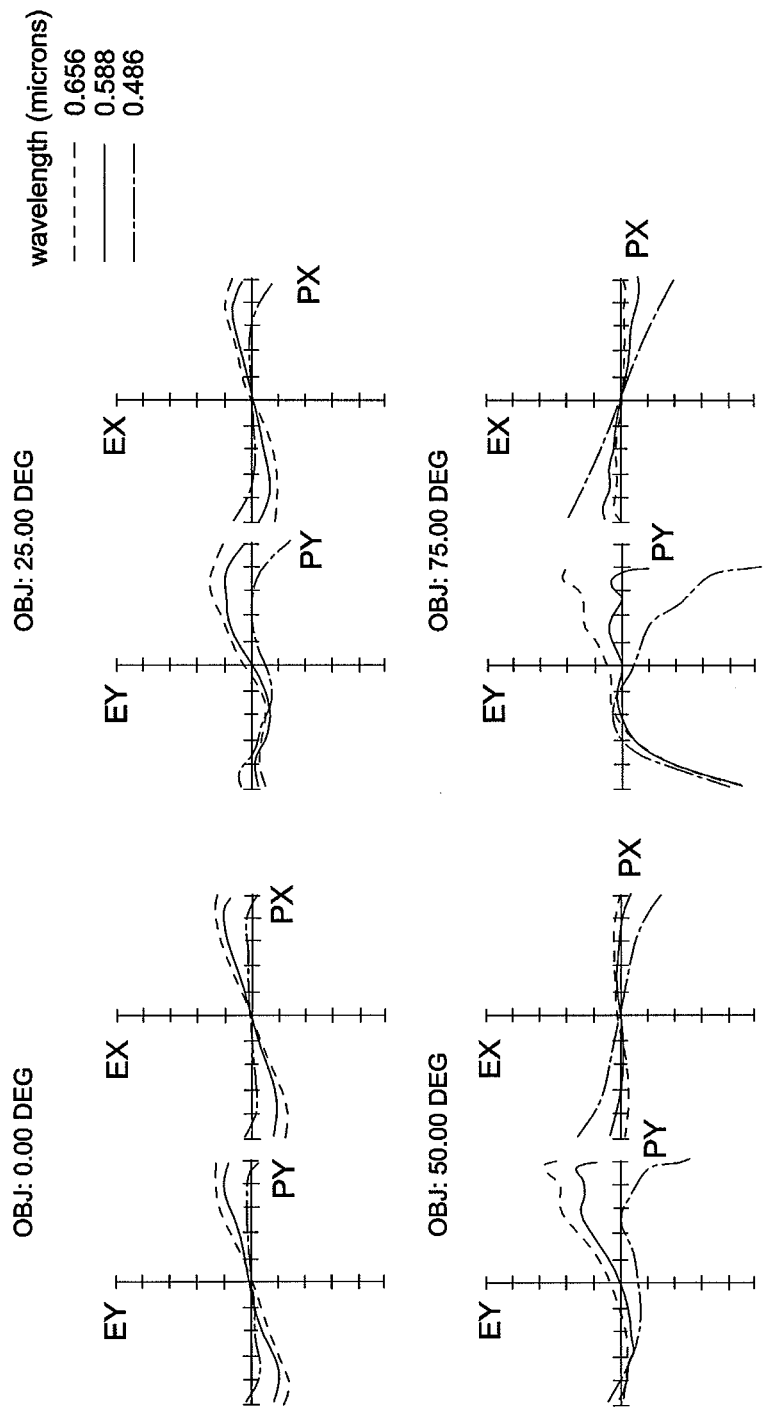

FIGS. 10-12 show aberration curves of the optical lens system illustrated in FIG. 9. FIG. 10 illustrates an astigmatic field curve, FIG. 11 illustrates a percentage distortion curve, and FIG. 12 shows a transverse ray fan plot.

An optical lens system according to another embodiment of the invention may include five lens elements L1, L2, L3, L4 and L5 arranged in order, along an optical axis 12, from an object side to an image side. An aperture stop 14 is located between the lens element L3 and the lens element L4. A light sensitive receiver 16, for example, an image sensor, is located on an image side of the lens element L5. An additional element 18, for example, a cover plate and/or filter, is located between the light sensitive receiver 16 and the lens element L5 and does not affect a focal length of the optical lens system. Each of the lens elements L1-L5 may be a single and non-cemented lens element with refractive power. The lens element L1 may have a negative power and a meniscus shape to contribute to enlarge the field of view of the optical lens system. The lens element L2 may have a negative power and a convex image-side surface to contribute to correct the off-axis aberration, and the lens element L2 may have at least one aspheric surface. The lens element L3 may have a positive power and contribute to correct the aberration, and the lens element L4 may have a positive power and at least one aspheric surface to contribute to correct the aberration. The lens element L5 may have a negative power to contribute to balance the chromatic aberration and correct the off-axis aberration and may have at least one aspheric surface.

The optical lens system according to one embodiment may satisfy the following condition:

$$0.7 < |f2/f3| < 1.9,$$

where f2 denotes a focal length of the lens element L2 and f3 denotes a focal length of the lens element L3 of the optical lens system. When the absolute value of f2/f3 is not within the range, the correction to aberration may become weaker to lower the resolution of the optical lens system.

In one embodiment, each of the lens elements L1-L5 can be made of glass or plastic. When the lens element is made of glass, the distribution of the refractive power of the optical lens system may be more flexible to design, and the glass material is not sensitive to temperature variations to ensure competent resolution of the optical lens system under different ambient temperatures. When the lens element is made of plastic, the manufacturing cost can be effectively reduced. Further, because the lens element may have at least one aspheric surface, more controllable variables are obtained, and the aberration is reduced, as well as the number of required lens elements can be reduced on constructing an optical lens system to reduce the total track length.

According to the above embodiments, the optical lens system is featured with good correction ability and high image quality, in products such as vehicle cameras, surveillance cameras and mobile devices.

A fourth design example of the optical lens system is described in detail below with reference to FIG. 13. The lens element L1 with negative refractive power has a convex object-side surface S1 and a concave image-side surface S2. The lens element L2 with negative refractive power has a convex object-side surface S3 and a concave image-side surface S4. The lens element L3 with positive refractive power has a convex object-side surface S5 and a convex image-side surface S6. The lens element L4 with positive refractive power has a convex object-side surface S8 and a convex image-side surface S9. The lens element L5 with negative refractive power has a concave object-side surface S10 and a concave image-side surface S11. The detailed optical data of the fourth example are shown in Table 7 and the aspheric surface data are shown in Table 8 below.

TABLE 7

F = 1.52 mm, Fno = 2.43, FOV = 190 deg.

| Surface | radius of curvature (mm) | thickness (mm) | refractive index | Abbe number |
|---|---|---|---|---|
| S1 | 16.598 | 0.700 | 1.729 | 54.683 |
| S2 | 3.593 | 1.913 | | |
| S3 | 9.180 | 0.600 | 1.544 | 55.951 |
| S4 | 2.239 | 2.760 | | |
| S5 | 6.280 | 2.500 | 1.786 | 44.186 |
| S6 | −5.717 | 0.785 | | |
| S7 (aperture stop) | Infinity | 0.507 | | |
| S8 | 3.237 | 1.854 | 1.544 | 55.951 |
| S9 | −1.699 | 0.100 | | |
| S10 | −2.357 | 0.649 | 1.615 | 25.920 |
| S11 | 7.517 | 0.393 | | |
| S12 (filter/cover plate) | Infinity | 0.710 | 1.525 | 54.087 |
| S13 (filter/cover plate) | Infinity | 0.706 | | |

TABLE 8

| Radius | 9.180 | 2.239 | 3.237 | −1.699 | −2.357 | 7.517 |
|---|---|---|---|---|---|---|
| K | 0.00000E+00 | 0.00000E+00 | 0.00000E+00 | 0.00000E+00 | 0.00000E+00 | 0.00000E+00 |
| A | 1.00902E−02 | 8.84114E−03 | 0.00000E+00 | −1.74888E−02 | −1.29349E−01 | −5.49567E−02 |
| B | −6.82962E−04 | 3.37753E−03 | 0.00000E+00 | 3.01968E−03 | 8.18195E−03 | 8.27426E−03 |
| C | 0.00000E+00 | 0.00000E+00 | 0.00000E+00 | 0.00000E+00 | 0.00000E+00 | 0.00000E+00 |
| D | 0.00000E+00 | 0.00000E+00 | 0.00000E+00 | 0.00000E+00 | 0.00000E+00 | 0.00000E+00 |
| E | 0.00000E+00 | 0.00000E+00 | 0.00000E+00 | 0.00000E+00 | 0.00000E+00 | 0.00000E+00 |
| F | 0.00000E+00 | 0.00000E+00 | 0.00000E+00 | 0.00000E+00 | 0.00000E+00 | 0.00000E+00 |

Figure 13:
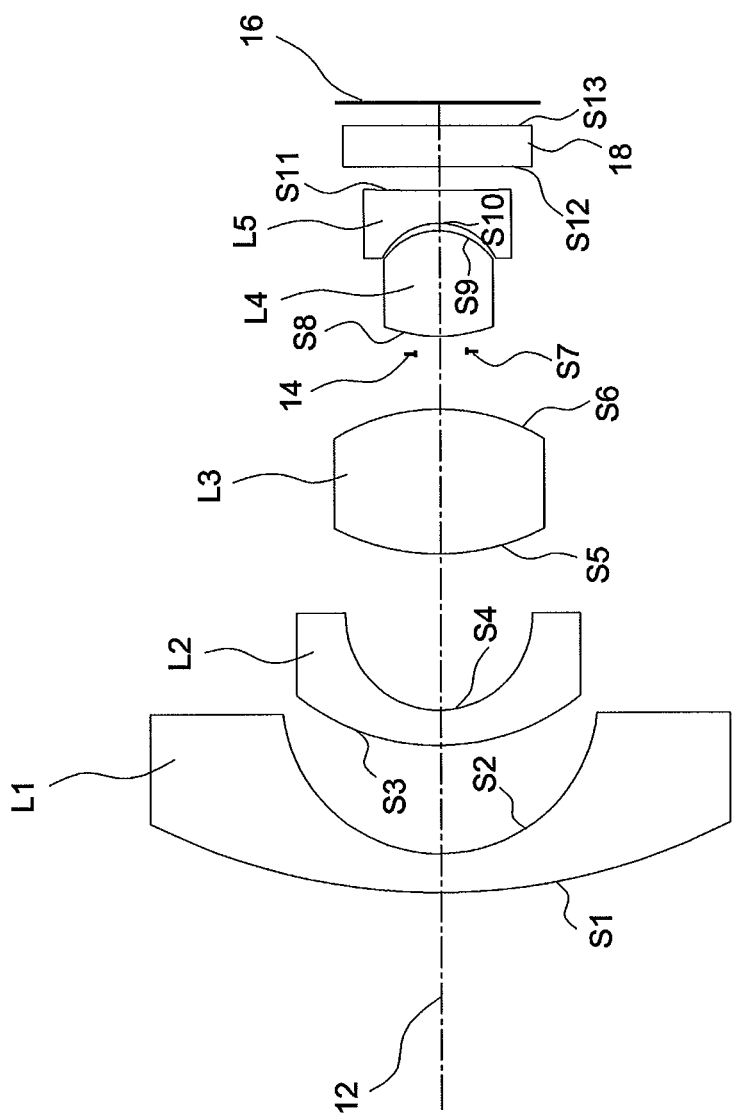
FIG. 13 shows a schematic diagram illustrating an optical lens system according to another embodiment of the invention.
Figures 14, 15:
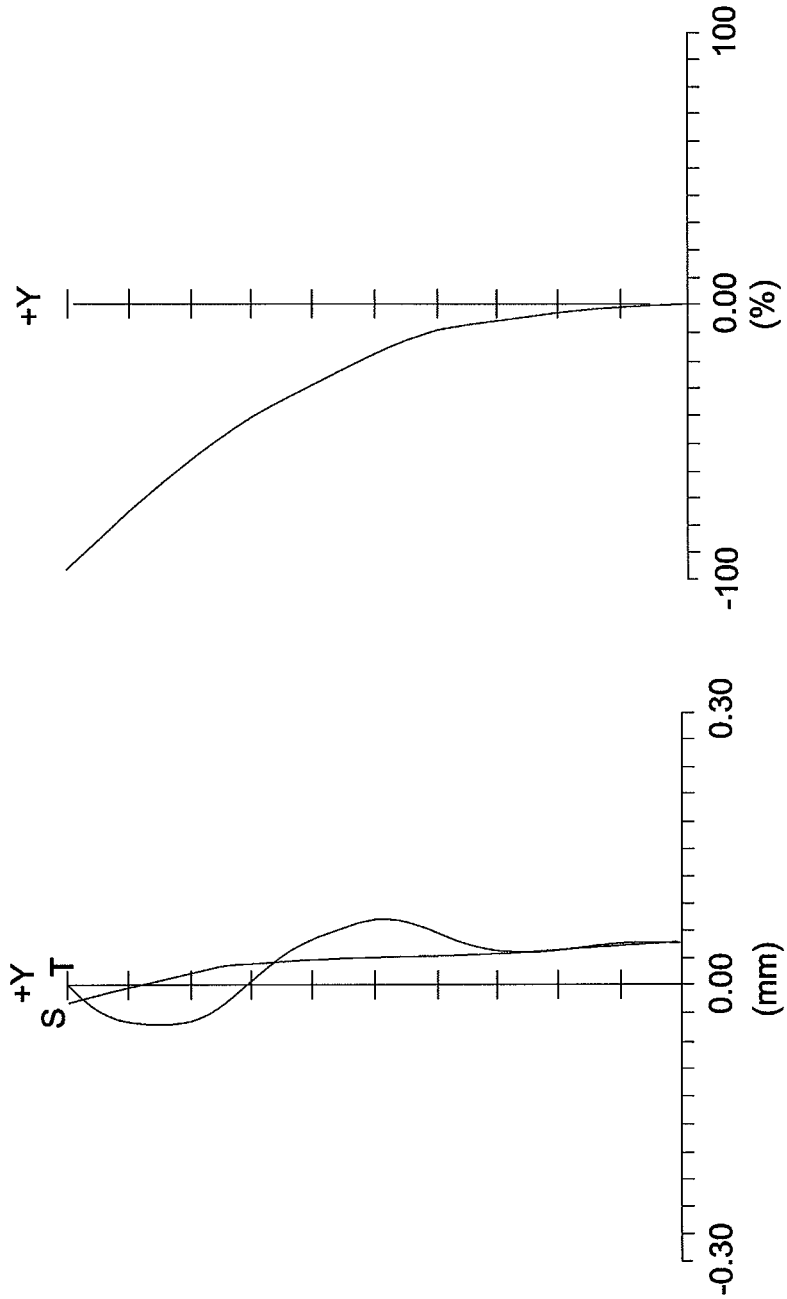
FIGS. 14-16 show aberration curves of the optical lens system illustrated in FIG. 13.
Figure 16:
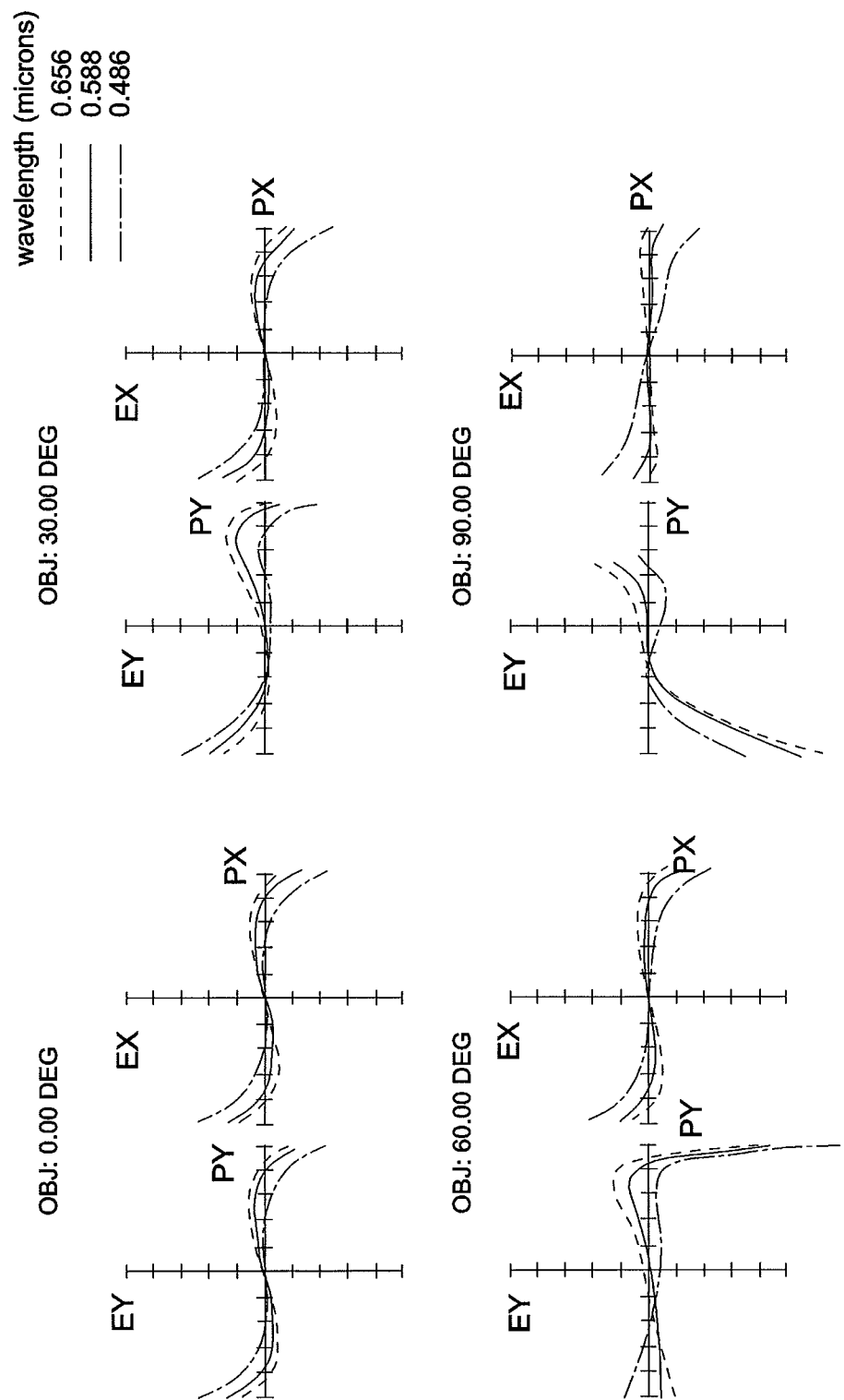

FIGS. 14-16 show aberration curves of the optical lens system illustrated in FIG. 13. FIG. 14 illustrates an astigmatic field curve, FIG. 15 illustrates a percentage distortion curve, and FIG. 16 shows a transverse ray fan plot.

A fifth design example of the optical lens system is described in detail below with reference to FIG. 17. The lens element L1 with negative refractive power has a convex object-side surface S1 and a concave image-side surface S2. The lens element L2 with negative refractive power has a convex object-side surface S3 and a concave image-side surface S4. The lens element L3 with positive refractive power has a convex object-side surface S5 and a convex image-side surface S6. The lens element L4 with positive refractive power has a convex object-side surface S8 and a convex image-side surface S9. The lens element L5 with negative refractive power has a concave object-side surface S10 and a convex image-side surface S11. The detailed optical data of the fifth example are shown in Table 9 and the aspheric surface data are shown in Table 10 below.

TABLE 9

F = 1.55 mm, Fno = 2.22, FOV = 180 deg.

| Surface | radius of curvature (mm) | thickness (mm) | refractive index | Abbe number |
|---|---|---|---|---|
| S1 | 12.564 | 0.700 | 1.729 | 54.683 |
| S2 | 3.792 | 2.306 | | |
| S3 | 25.014 | 0.600 | 1.544 | 55.951 |
| S4 | 2.085 | 2.870 | | |
| S5 | 6.185 | 1.627 | 1.786 | 44.186 |
| S6 | −5.679 | 0.897 | | |
| S7 (aperture stop) | Infinity | 0.811 | | |
| S8 | 2.890 | 1.498 | 1.544 | 55.951 |
| S9 | −1.648 | 0.100 | | |
| S10 | −1.497 | 0.599 | 1.615 | 25.920 |
| S11 | −20.807 | 0.393 | | |
| S12 (filter/cover plate) | Infinity | 0.710 | 1.525 | 54.087 |
| S13 (filter/cover plate) | Infinity | 1.103 | | |

TABLE 10

| Radius | 25.014 | 2.085 | 2.890 | −1.648 | −1.497 | −20.807 |
|---|---|---|---|---|---|---|
| K | 0.00000E+00 | 0.00000E+00 | 0.00000E+00 | 0.00000E+00 | 0.00000E+00 | 0.00000E+00 |
| A | −1.70290E−03 | 3.79384E−03 | −1.60188E−02 | −4.52607E−02 | −4.02643E−02 | 8.40801E−03 |
| B | 3.60405E−05 | 1.89084E−03 | 0.00000E+00 | 5.04022E−02 | 7.52121E−02 | 9.36910E−03 |
| C | 0.00000E+00 | 3.53937E−04 | 0.00000E+00 | 0.00000E+00 | 0.00000E+00 | 0.00000E+00 |
| D | 0.00000E+00 | 0.00000E+00 | 0.00000E+00 | 0.00000E+00 | 0.00000E+00 | 0.00000E+00 |
| E | 0.00000E+00 | 0.00000E+00 | 0.00000E+00 | 0.00000E+00 | 0.00000E+00 | 0.00000E+00 |
| F | 0.00000E+00 | 0.00000E+00 | 0.00000E+00 | 0.00000E+00 | 0.00000E+00 | 0.00000E+00 |

Figure 17:
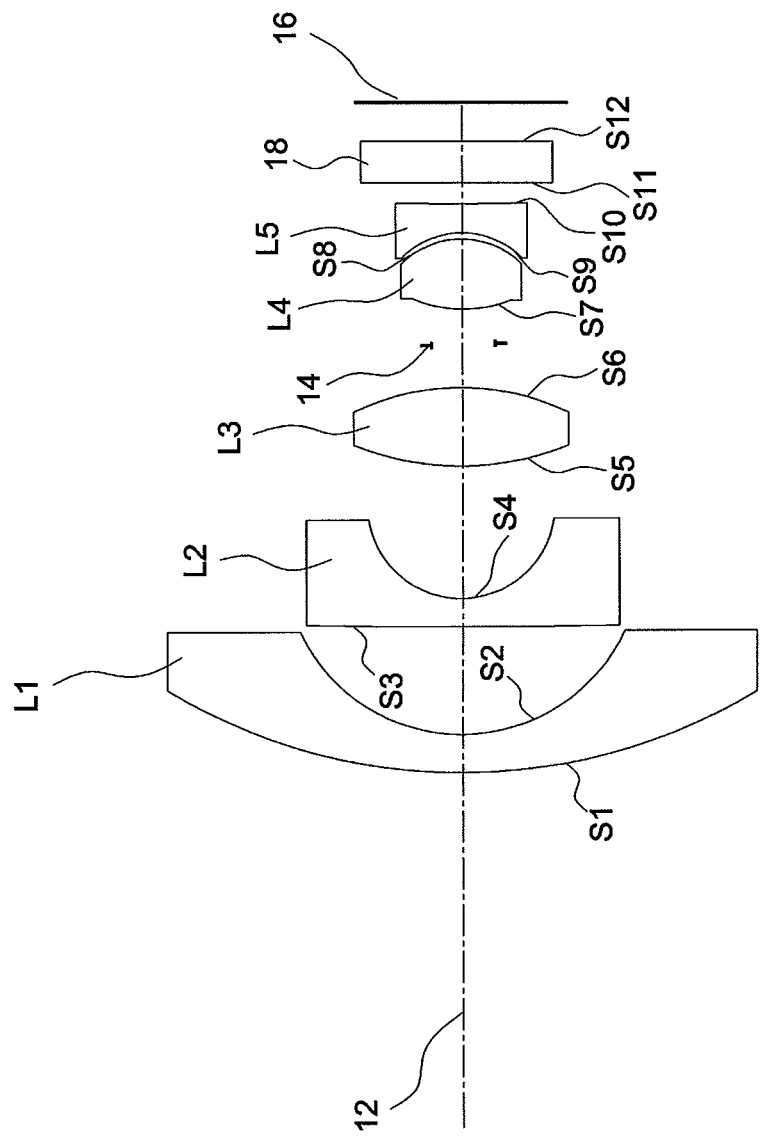
FIG. 17 shows a schematic diagram illustrating an optical lens system according to another embodiment of the invention.
Figure 20:
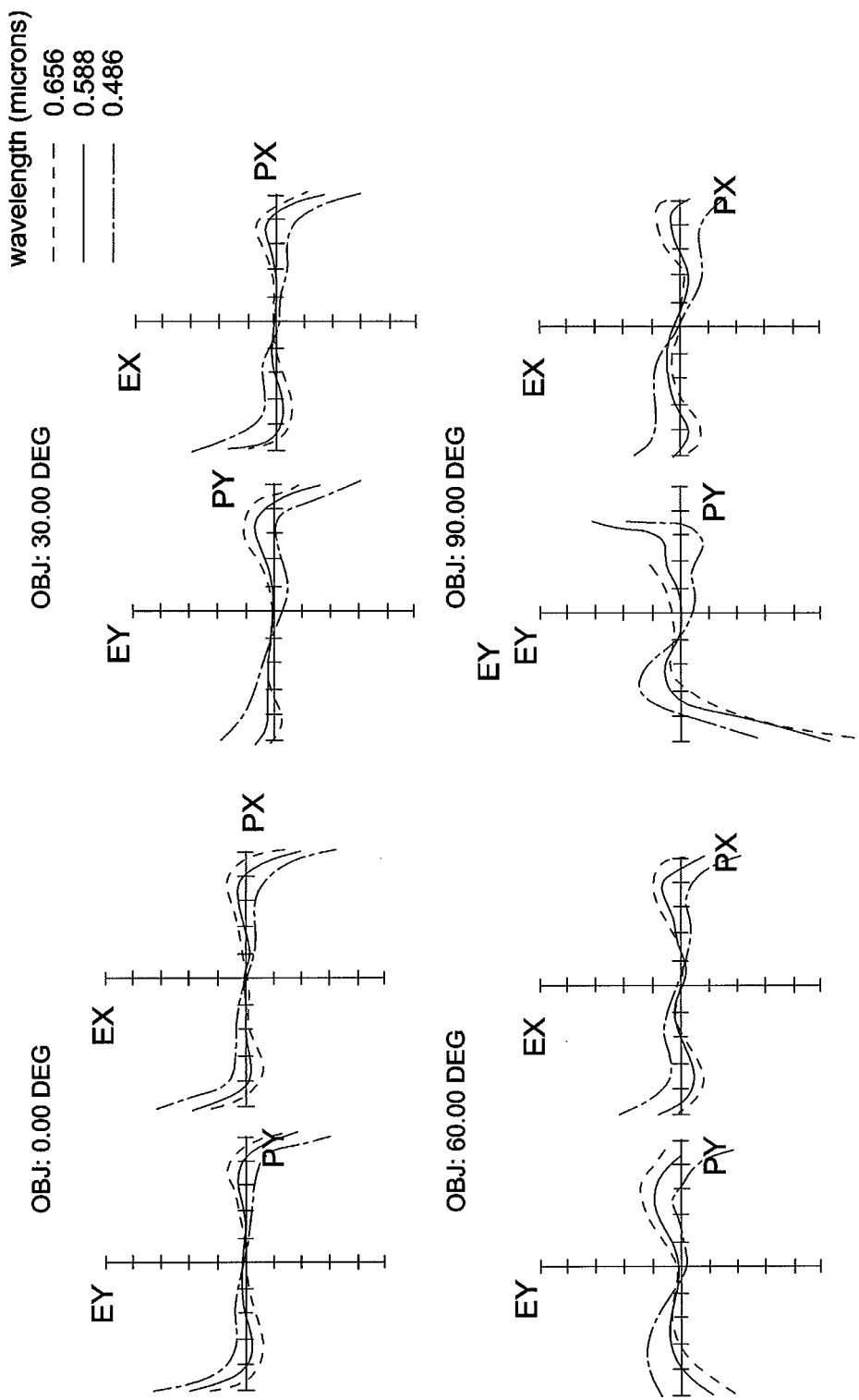

FIGS. 18-20 show aberration curves of the optical lens system illustrated in FIG. 17. FIG. 18 illustrates an astigmatic field curve, FIG. 19 illustrates a percentage distortion curve, and FIG. 20 shows a transverse ray fan plot.

A sixth design example of the optical lens system is described in detail below with reference to FIG. 21. The lens element L1 with negative refractive power has a convex object-side surface S1 and a concave image-side surface S2. The lens element L2 with negative refractive power has a convex object-side surface S3 and a concave image-side surface S4. The lens element L3 with positive refractive power has a convex object-side surface S5 and a convex image-side surface S6. The lens element L4 with positive refractive power has a convex object-side surface S8 and a convex image-side surface S9. The lens element L5 with negative refractive power has a concave object-side surface S10 and a convex image-side surface S11. The detailed optical data of the sixth example are shown in Table 11 and the aspheric surface data are shown in Table 12 below.

TABLE 11

F = 1.63 mm, Fno = 2.4, FOV = 180 deg.

| Surface | radius of curvature (mm) | thickness (mm) | refractive index | Abbe number |
|---|---|---|---|---|
| S1 | 25.865 | 0.700 | 1.729 | 54.683 |
| S2 | 3.689 | 2.305 | | |
| S3 | 7.183 | 0.600 | 1.531 | 56.044 |
| S4 | 2.213 | 2.860 | | |
| S5 | 4.990 | 1.599 | 1.786 | 44.186 |
| S6 | −7.006 | 1.014 | | |
| S7 (aperture stop) | Infinity | 0.833 | | |
| S8 | 2.912 | 1.450 | 1.531 | 56.044 |
| S9 | −1.649 | 0.100 | | |
| S10 | −1.514 | 0.548 | 1.637910, | 23.256 |
| S11 | −15.048 | 0.393 | | |
| S12 (filter/cover plate) | Infinity | 0.710 | 1.525 | 54.087 |
| S13 (filter/cover plate) | Infinity | 0.985 | | |

TABLE 12

| Radius | 7.183 | 2.213 | 2.912 | −1.649 | −1.514 | −15.048 |
|---|---|---|---|---|---|---|
| K | 0.00000E+00 | 0.00000E+00 | 0.00000E+00 | 0.00000E+00 | 0.00000E+00 | 0.00000E+00 |
| A | 2.50380E−03 | 8.37469E−03 | −2.45298E−02 | −5.04500E−02 | −3.72341E−02 | 6.96021E−03 |
| B | 1.43337E−05 | 6.76848E−04 | 0.00000E+00 | 5.31032E−02 | 7.43357E−02 | 8.18261E−03 |
| C | 0.00000E+00 | 4.87380E−04 | 0.00000E+00 | 0.00000E+00 | 0.00000E+00 | 0.00000E+00 |
| D | 0.00000E+00 | 0.00000E+00 | 0.00000E+00 | 0.00000E+00 | 0.00000E+00 | 0.00000E+00 |
| E | 0.00000E+00 | 0.00000E+00 | 0.00000E+00 | 0.00000E+00 | 0.00000E+00 | 0.00000E+00 |
| F | 0.00000E+00 | 0.00000E+00 | 0.00000E+00 | 0.00000E+00 | 0.00000E+00 | 0.00000E+00 |

Figure 21:
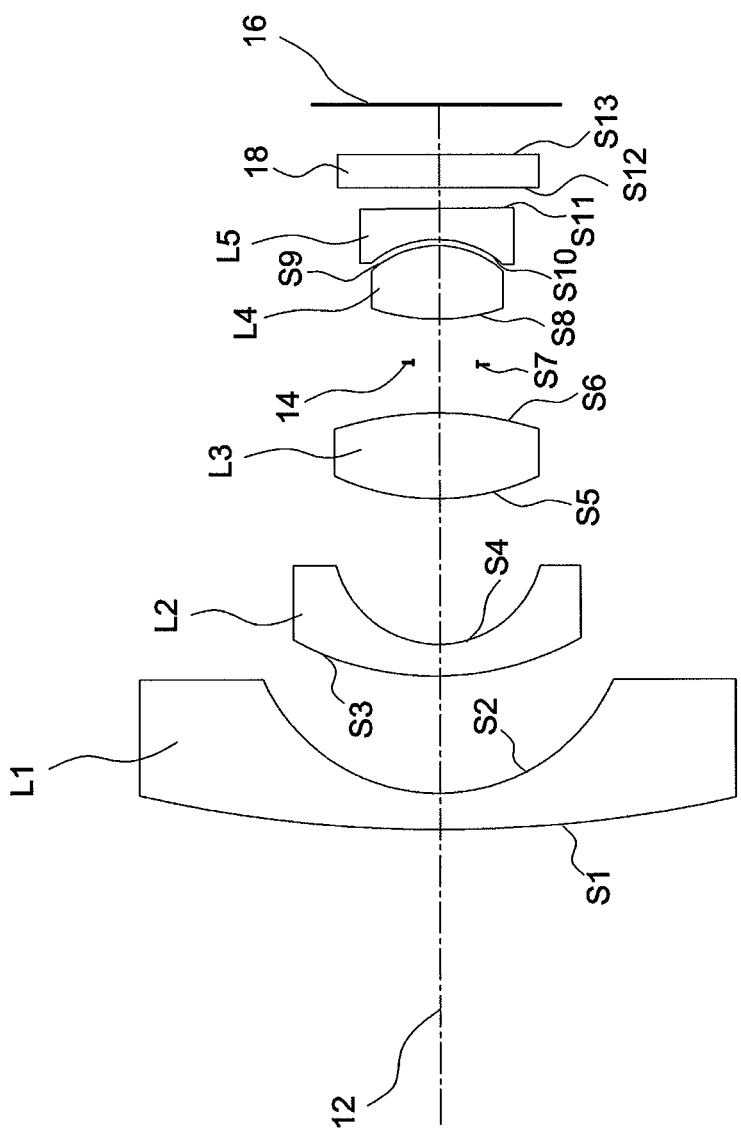
FIG. 21 shows a schematic diagram illustrating an optical lens system according to another embodiment of the invention.
Figure 24:
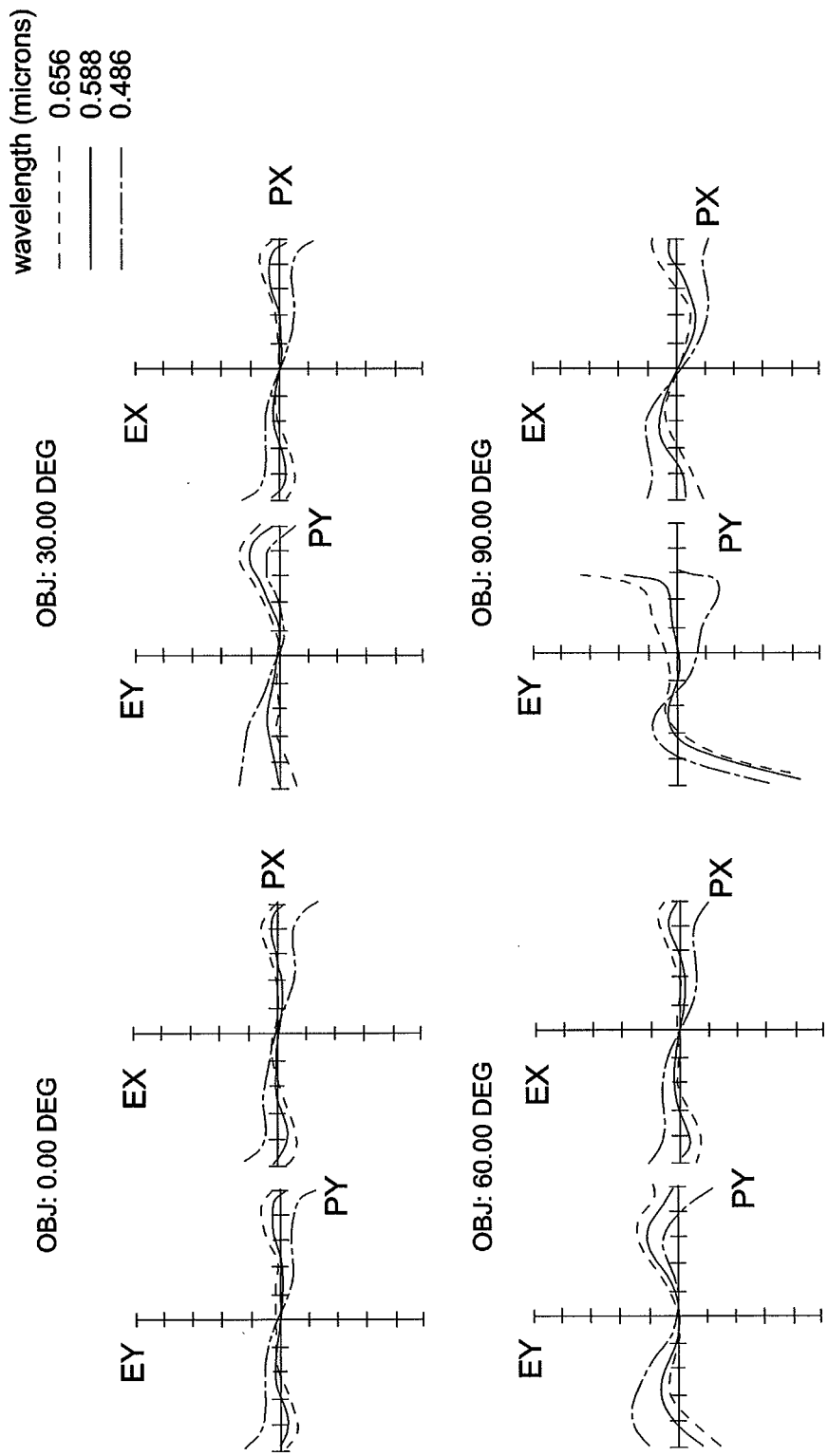

FIGS. 22-24 show aberration curves of the optical lens system illustrated in FIG. 21. FIG. 22 illustrates an astigmatic field curve, FIG. 23 illustrates a percentage distortion curve, and FIG. 24 shows a transverse ray fan plot.

Note the parameters listed in Tables 1-12 are only for exemplified purposes but do not limit the invention. It should be appreciated that variations about the design parameters or setting may be made in the embodiments by persons skilled in the art without departing from the scope of the invention. Therefore, any imaging lens system of the same structure is considered to be within the scope of the present disclosure even if it uses different data. The embodiments depicted above and the appended drawings are exemplary and are not intended to limit the scope of the present disclosure.

What is claimed is:

1. An optical lens system, comprising:
   a first lens element of negative refractive power having a meniscus shape;
   a second lens element of positive refractive power having a convex image-side surface and a concave object-side surface and disposed adjacent to the first lens element, wherein the second lens is a spherical lens;
   a third lens element of positive refractive power having at least one aspheric surface and disposed adjacent to the second lens element; and
   a fourth lens element of negative refractive power having at least one aspheric surface and disposed adjacent to the third lens element,
   wherein the optical lens system has a maximum field of view in object space of at least 150 degrees.

2. The optical lens system as claimed in claim 1, wherein the condition:
   0.2<|f1/f2|<0.7 is satisfied, where f1 denotes a focal length of the first lens element and f2 denotes a focal length of the second lens element.

3. The optical lens system as claimed in claim 1, wherein the condition:
   0.8<|f3/EFL|<2.0 is satisfied, where f3 denotes a focal length of the third lens element L3 and EFL denotes an effective focal length of the optical lens system.

4. The optical lens system as claimed in claim 1, wherein the first lens element has a convex object-side surface and a concave image-side surface.

5. The optical lens system as claimed in claim 1, wherein the third lens element has a convex image-side surface.

6. The optical lens system as claimed in claim 1, wherein the fourth lens element has a concave image-side surface.

7. The optical lens system as claimed in claim 1, wherein the fourth lens element has a convex image-side surface.

8. The optical lens system as claimed in claim 1, further comprising:
   a lens element of negative refractive power disposed between the first and second lens elements.

9. The optical lens system as claimed in claim 1, further comprising an aperture stop disposed between the second lens element and the third lens element.

10. An optical lens system comprising in order from an object side to an image side:
    a first lens element having negative refractive power, wherein the first lens element has a convex object-side surface and a concave image-side surface;
    a second lens element having refractive power, wherein the second lens element has a convex object-side surface and a convex image-side surface, and an interval between the first lens element and the second lens element is smaller than or equal to 2.306 mm;
    a third lens element having refractive power and a convex image-side surface; and
    a fourth lens element having refractive power, wherein in at least one of the third lens element and the fourth lens element is an aspheric lens element, wherein the condition:
    0.2<|f1/f2|<0.7 is satisfied, where f1 denotes a focal length of the first lens element and f2 denotes a focal length of the second lens element.

11. The optical lens system as claimed in claim 10, wherein the optical lens system has a maximum field of view in object space of at least 150 degrees.

12. The optical lens system as claimed in claim 10, wherein the condition:

0.8<|f3/EFL|<2.0 is satisfied, where f3 denotes a focal length of the third lens element L3 and EFL denotes an effective focal length of the optical lens system.

13. The optical lens system as claimed in claim 10, wherein the condition:

0.7<|f2/f3|<1.9 is satisfied, where f2 denotes a focal length of the second lens element and f3 denotes a focal length of the third lens element.

14. The optical lens system as claimed in claim 10, further comprising an aperture stop disposed between the second lens element and the third lens element.

15. The optical lens system as claimed in claim 10, further comprising:
a lens element of negative refractive power disposed between the first and second lens elements.

16. An optical lens system comprising in order from an object side to an image side:
a first lens element having negative refractive power, wherein the first lens element has a convex object-side surface and a concave image-side surface;
a second lens element having refractive power, wherein the second lens element has a convex object-side surface and a convex image-side surface, and an interval between the first lens element and the second lens element is smaller than or equal to 2.306 mm;
a third lens element having refractive power and a convex image-side surface;
a fourth lens element having refractive power, wherein in at least one of the third lens element and the fourth lens element is an aspheric lens element; and
a lens element of negative refractive power disposed between the first and second lens elements,
wherein the optical lens system has a maximum field of view in object space of at least 150 degrees.

17. An optical lens system, comprising:
a first lens element of negative refractive power having a meniscus shape;
a second lens element of positive refractive power having a convex image-side surface and disposed adjacent to the first lens element, wherein the second lens is a spherical lens;
a third lens element of positive refractive power having at least one aspheric surface and disposed adjacent to the second lens element;
a fourth lens element of negative refractive power having at least one aspheric surface and disposed adjacent to the third lens element; and
a lens element of negative refractive power disposed between the first and second lens elements,
wherein the optical lens system has a maximum field of view in object space of at least 150 degrees.

* * * * *